United States Patent
Costin et al.

(10) Patent No.: US 7,693,638 B2
(45) Date of Patent: Apr. 6, 2010

(54) COMMANDED CLUTCH DIAGNOSTIC FOR HYBRID VEHICLES

(75) Inventors: Mark H. Costin, Bloomfield Township, MI (US); Thyagarajan Sadasiwan, Ypsilanti, MI (US); Peter E. Wu, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 619 days.

(21) Appl. No.: 11/656,927

(22) Filed: Jan. 23, 2007

(65) Prior Publication Data

US 2008/0177453 A1     Jul. 24, 2008

(51) Int. Cl.
    *G06F 7/02*     (2006.01)
    *G06F 19/00*     (2006.01)

(52) U.S. Cl. .......................... 701/67; 701/29; 701/58; 477/97

(58) Field of Classification Search .................. 701/67, 701/29, 31, 33, 58, 60, 22, 35; 477/97, 5, 477/45; 180/65, 28

See application file for complete search history.

(56) References Cited

U.S. PATENT DOCUMENTS

| | | | |
|---|---|---|---|
| 6,098,733 A * | 8/2000 | Ibaraki et al. | 180/65.28 |
| 6,321,150 B1 * | 11/2001 | Nitta | 701/29 |
| 6,547,694 B2 * | 4/2003 | Miyagawa et al. | 477/45 |
| 6,953,409 B2 | 10/2005 | Schmidt et al. | |

* cited by examiner

*Primary Examiner*—Tan Q Nguyen

(57) ABSTRACT

A method of regulating operation of a hybrid transmission in a vehicle includes determining a desired transmission state using a first module, generating transmission control signals based on the desired transmission state using a second module and receiving at least one transmission parameter signal at the second module. An actual transmission state is determined based on the at least one transmission parameter signal at the second module. Whether a fault is present within the hybrid transmission control system is determined based on the desired transmission state and the actual transmission state at the first control module.

24 Claims, 3 Drawing Sheets

COMMANDED CLUTCH DIAGNOSTIC FOR HYBRID VEHICLES

FIELD

The present disclosure relates to transmission state control, and more particularly to a commanded clutch diagnostic for a hybrid transmission.

BACKGROUND

The statements in this section merely provide background information related to the present disclosure and may not constitute prior art.

Traditionally, vehicles include multiple systems that regulate overall operation of the vehicle. For example, the vehicle includes a power plant (e.g., an internal combustion engine and/or an electric machine) that generates drive torque, an energy storage device (e.g., battery pack) that provides electrical energy, a transmission that distributes the drive torque to drive wheels and various other systems.

Each of the systems includes an associated control modules or modules that communicate with one another to regulate operation of the vehicle. For example, operation of a hybrid transmission (i.e., a transmission including at least one electric machine for providing drive torque and regenerative braking) is regulated using a hybrid control module and a transmission control module. It is important that each of the control modules is properly functioning to ensure proper operation of the hybrid transmission.

Control module failures (e.g., a software failure, RAM and/or ROM corruption, and/or an arithmetic and logic unit (ALU) failure) can be protected against by having a secondary path of calculation for a security-critical variable using a seed and key, or a duplicate path in a separate control module can be implemented. These security methods have to be specifically designed for the particular feature which is identified as a security-critical feature. Furthermore, these security methods increase the complexity, and thus the cost of the individual control modules.

SUMMARY

Accordingly, the present disclosure provides a method of regulating operation of a hybrid transmission in a vehicle. The method includes determining a desired transmission state using a first module, generating transmission control signals based on the desired transmission state using a second module and receiving at least one transmission parameter signal at the second module. An actual transmission state is determined based on the at least one transmission parameter signal at the second module. Whether a fault is present within the hybrid transmission control system is determined based on the desired transmission state and the actual transmission state at the first control module.

In another feature, the desired transmission state is determined based on a plurality of operating parameters.

In another feature, the method further includes signaling a fault when the desired transmission state is not equivalent to the actual transmission state.

In another feature, the method further includes initiating corrective action when the fault is signaled.

In still another feature, the method further includes initiating remedial action when the fault is signaled.

In yet other features, the at least one transmission parameter signal corresponds to a parameter of one of a solenoid and an on-off switch of a hybrid transmission. The parameter includes a position and/or a pressure.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
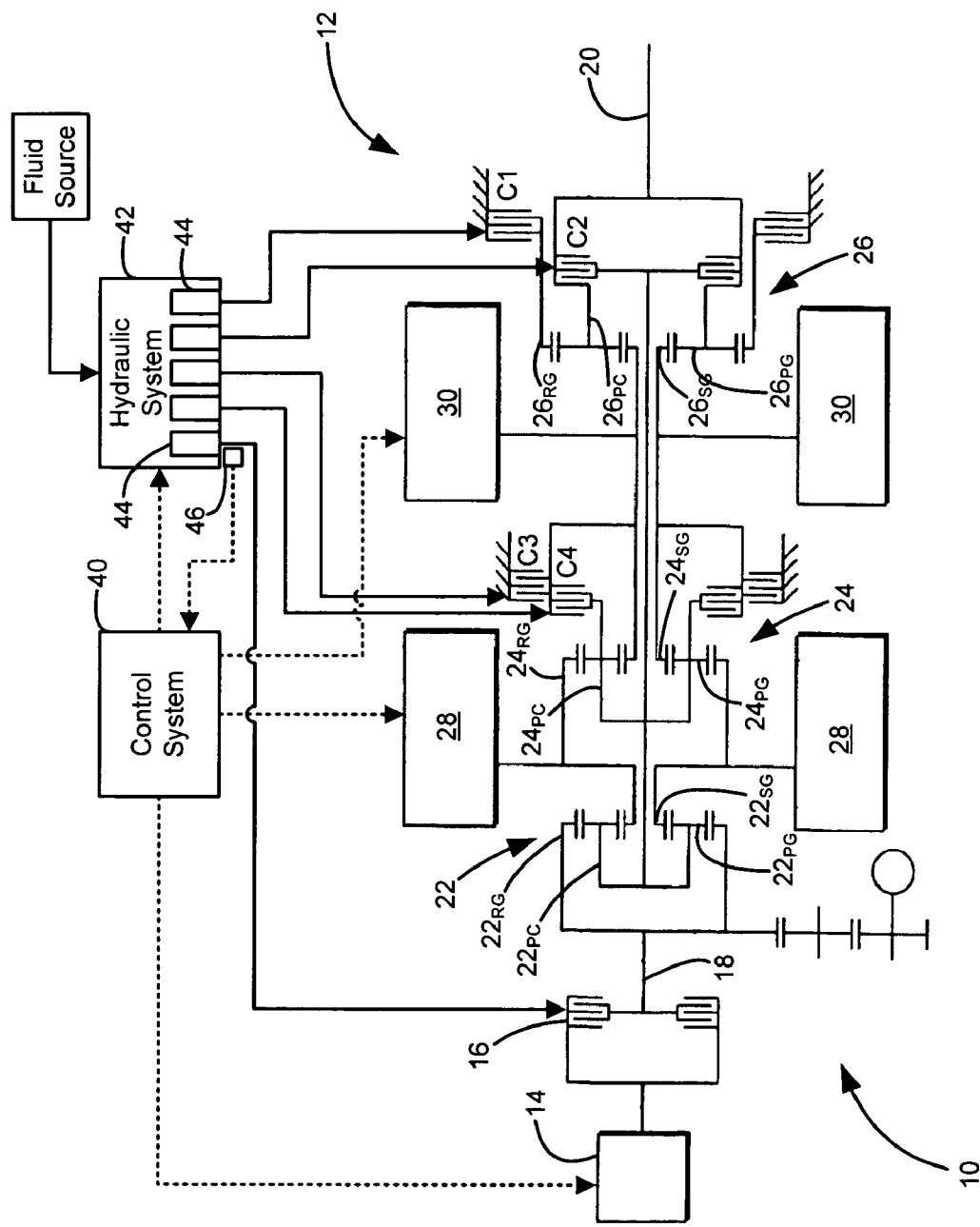
FIG. 1 is a functional block diagram of an exemplary hybrid vehicle system.

The following description is merely exemplary in nature and is not intended to limit the present disclosure, application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary vehicle system 10 is illustrated including an exemplary hybrid transmission 12. The hybrid transmission 12 is described in further detail in commonly assigned U.S. Pat. No. 6,953,409, issued on Oct. 11, 2005 and entitled Two-Mode Compound-Split Hybrid Electro-Mechanical Transmission Having Four Fixed Ratios, the disclosure of which is expressly incorporated herein by reference. Although the hybrid vehicle control of the present disclosure is described with reference to the hybrid transmission 12, it is appreciated that the hybrid vehicle control can be implemented with other transmission systems.

The vehicle system 10 further includes an engine 14 that selectively drives the hybrid transmission 12 through a main clutch 16. The exemplary hybrid transmission 12 is a two-mode, compound-split, electro-mechanical transmission and includes an input shaft 18 and an output shaft 20. The hybrid transmission 12 further includes first second and third planetary gear sets 22, 24, 26, first and second electric machines 28, 30, and first, second, third and fourth clutches C1, C2, C3, C4. The planetary gear sets 22, 24, 26 each include a sun gear $22_{SG}$, $24_{SG}$, $26_{SG}$, planetary gears $22_{PG}$, $24_{PG}$, $26_{PG}$, a planetary carrier $22_{PC}$, $24_{PC}$, $26_{PC}$ and a ring gear $22_{RG}$, $24_{RG}$, $26_{RG}$. The sun gears $22_{SG}$, $24_{SG}$, $26_{SG}$, the planetary carriers $22_{PC}$, $24_{PC}$, $26_{PC}$ and the ring gears $22_{RG}$, $24_{RG}$, $26_{RG}$ of the planetary gear sets 22, 24, 26 are coupled to provide four fixed gear ratios, as explained in further detail in U.S. Pat. No. 6,953,409. A control system 40 regulates operation of the engine 14 and the hybrid transmission 12 based on the hybrid vehicle control of the present disclosure.

The first and second electric machines 28, 30 are each operable in a generator mode and a motor mode. In the generator mode, the electric machine 28, 30 absorbs rotational energy, which can be converted into electrical energy that is stored in an energy storage device (e.g., a battery and/or a super-capacitor). In the motor mode, the electric machine 28, 30 drives one or more components of the hybrid transmission 12. More specifically, the first electrical machine 28 is mechanically coupled with the sun gear $22_{SG}$ of the first planetary gear set 22 and the rung gear of the second planetary gear. The second electrical machine 30 is directly mechanically coupled with the sun gear $24_{SG}$ of the second planetary gear set 24 and the sun gear $26_{SG}$ of the third planetary gear set 26.

The first, second, third and fourth clutches C1, C2, C3, C4 are implemented to establish various gear ratios. The first clutch C1 functions as a brake and is selectively engageable to brake rotation of the ring gear $26_{RG}$ of the third planetary gear set 26. The second clutch C2 is selectively engageable to fix the planetary carriers $22_{PC}$, $24_{PC}$ of the first and second planetary gear sets 22, 24 with the planetary carrier $26_{PC}$ of the third planetary gear set 26 and the output shaft 20. The third clutch C3 functions as a brake and is selectively engageable to brake rotation of the sun gears $24_{SG}$, $26_{SG}$ of the second and third planetary gear sets 24, 26, to brake rotation of the second electric machine 30 and/or to brake rotation of the planetary carrier $24_{PC}$ of the second planetary gear set 24, depending on whether the fourth clutch C4 is engaged. The fourth clutch C4 is selectively engageable to couple the planetary carrier $24_{PC}$ of the second planetary gear set 24 with the sun gears $24_{SG}$, $26_{SG}$ of the second and third planetary gear sets 24, 26 and the second electric machine 30.

The hybrid transmission 12 is operable to provide first and second modes (Mode 1., Mode 2) and first, second, third and fourth fixed gear ratios ($1^{st}$, $2^{nd}$, $3^{rd}$, $4^{th}$) More specifically, the clutches C1, C2, C3, C4 and the electric machines 28, 30 are implemented to establish one of the modes and gear ratios in accordance with the following table:

|  |  |  | Gear |  |  |  |
| --- | --- | --- | --- | --- | --- | --- |
| Mode | $1^{st}$ EM | $2^{nd}$ EM | C1 | C2 | C3 | C4 |
| Mode 1 | G | M | X |  |  |  |
| $1^{st}$ |  |  | X |  |  | X |
| $2^{nd}$ |  |  | X | X |  |  |
| Mode 2 | M | M |  | X |  |  |
| $3^{rd}$ |  |  |  | X |  | X |
| $4^{th}$ |  |  |  | X | X |  | wherein G indicates operation in the generator mode, M indicates operation in the motor mode and X indicates clutch engagement.

Engagement of the first, second, third and fourth clutches C1, C2, C3, C4 is regulated by a hydraulic system 42 that distributes pressurized fluid to the various clutches 16, C1, C2, C3, C4. The hydraulic system 42 includes a plurality of on-off switches (not shown) and a plurality of solenoids 44, each of which regulates the hydraulic fluid flow to a respective clutch. Each solenoid 44 is operable between a fully open position and a fully closed position to regulate hydraulic fluid flow to a respective clutch. In the fully closed position, no hydraulic fluid is provided to the respective clutch. Accordingly, the fluid pressure downstream of the solenoid 44 should be at a minimum. In the fully open position, the maximum amount of hydraulic fluid is provided to the respective clutch and the fluid pressure downstream of the solenoid 44 should be at a maximum.

The control system 40 generates control signals that indicate which solenoids 44 and/or on-off valves are to be actuated and are communicated to the hydraulic system 42. A sensor 46 is associated with each solenoid and provides a feedback signal to the control system. Although a single sensor 46 is illustrated, it is appreciated that there is at least one sensor 46 associated with each solenoid 44. The sensor 46 includes one of a solenoid position sensor and/or a line pressure sensor. In the case of a solenoid position sensor, the sensor 46 provides a feedback signal to the control system 40 indicating the actuated position of the solenoid 44. In the case of a line pressure sensor, the sensor 46 provides a feedback signal to the control system 40 indicating the line pressure downstream of the solenoid 44 (i.e., the fluid pressure acting on the respective clutch).

Figure 2:
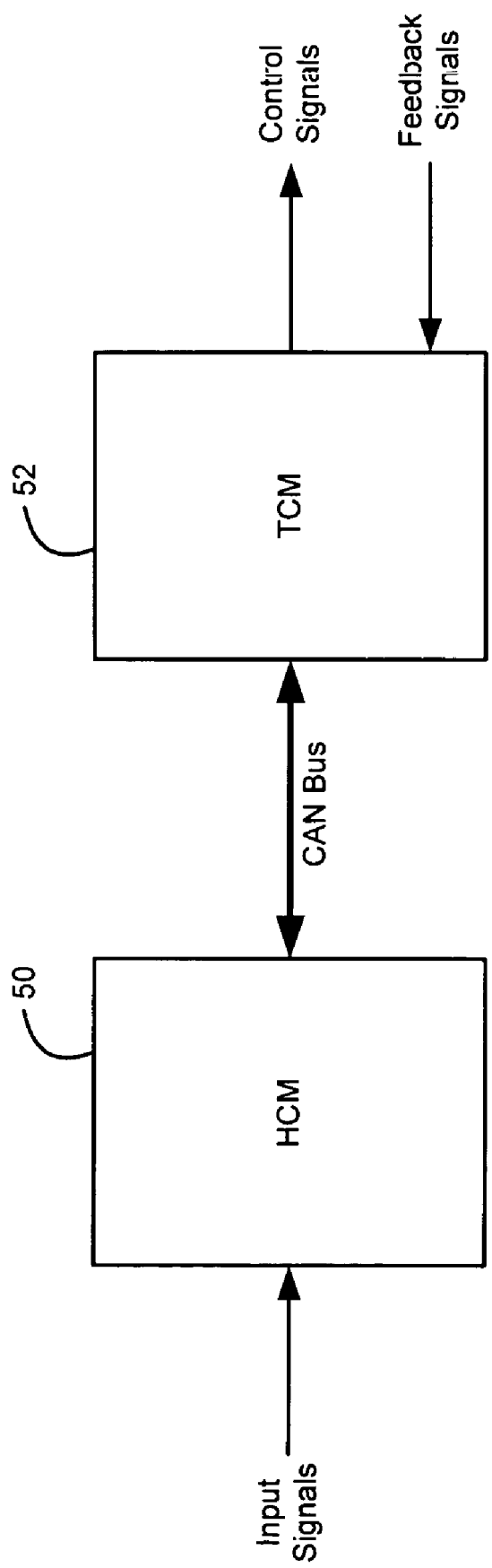
FIG. 2 is a functional block diagram of exemplary modules that regulate operation of the hybrid vehicle system in accordance with the present disclosure.

Referring now to FIG. 2, the control system 40 includes a first module 50, provided as a hybrid control module (HCM), and a second module 52, provided as a transmission control module (TCM). The first and second modules 50, 52 communicate via a controller area network (CAN) bus. The first module 50 receives input signals including, but not limited to, an accelerator pedal position signal, a brake pedal position signal, a drive range signal (e.g., P, R, N, D, L) and signal indicating the engine operating parameters. The first module 50 determines a desired transmission state ($TS_{DES}$) based on the input signals.

$TS_{DES}$ and a corresponding timestamp are saved into a memory of the first module 50 and are communicated to the second module 52 via the CAN bus, which determines the control signals for actuating the solenoids to achieve $TS_{DES}$. For example, if $TS_{DES}$ is $3^{rd}$ gear, the second module 52 generates control signals to actuate the solenoids 44 corresponding to C2 and C4. After the solenoids 44 are actuated, feedback signals from the sensors 46 are received by the second module 52. The second module 52 determines an actual transmission state ($TS_{ACT}$) based on the feedback signals. More specifically, each of the sensors 46 provides a feedback signal to the second module 52 indicating one of a solenoid position and a line pressure. Each solenoid position or line pressure signal indicates whether the respective clutch is engaged. In this manner, the second module 52 can determine which clutches are engaged and determines $TS_{ACT}$ based thereon.

$TS_{ACT}$ and a corresponding timestamp are communicated to the first module 50, which compares $TS_{DES}$ and $TS_{ACT}$. More specifically, the first module 50 retrieves $TS_{DES}$ from memory based on the timestamps. In this manner, $TS_{ACT}$ is compared with the proper $TS_{DES}$. If $TS_{DES}$ and $TS_{ACT}$ are equivalent, the first and second modules 50, 52 are deemed to be operating properly. If $TS_{DES}$ and $TS_{ACT}$ are not equivalent, a fault is signaled indicating a problem with at least one of the first and second modules 50, 52.

The fault can result from one of a plurality of failure modes. The failure modes can include, but are not limited to, a stuck CAN message, a corrupted $TS_{DES}$ (i.e., a fault with the first module (HCM)) and/or a corrupted $TS_{EST}$ (i.e., a fault with the second module (TCM)). Although the fault could be the result of solenoid and/or on-off switch component failures, such component failures are diagnosed using a parallel diagnostic routine (e.g. layer 1 security).

A plurality of corrective actions can be implemented, each of which corresponds to a particular failure mode. Exemplary corrective actions include, but are not limited to, using the last known good value or temporarily forcing neutral or a constant gear ratio in the case of a stuck CAN message and corrupted desired, and/or resetting the control module in the case of a so-called "evil" control module. If the corrective actions do not resolve the fault, remedial action can be implemented. The remedial action can include, but is not limited to, limiting the drivability of the vehicle. For example, operation of the hybrid transmission 12 can be restricted to one of the first and second modes.

Figure 3:
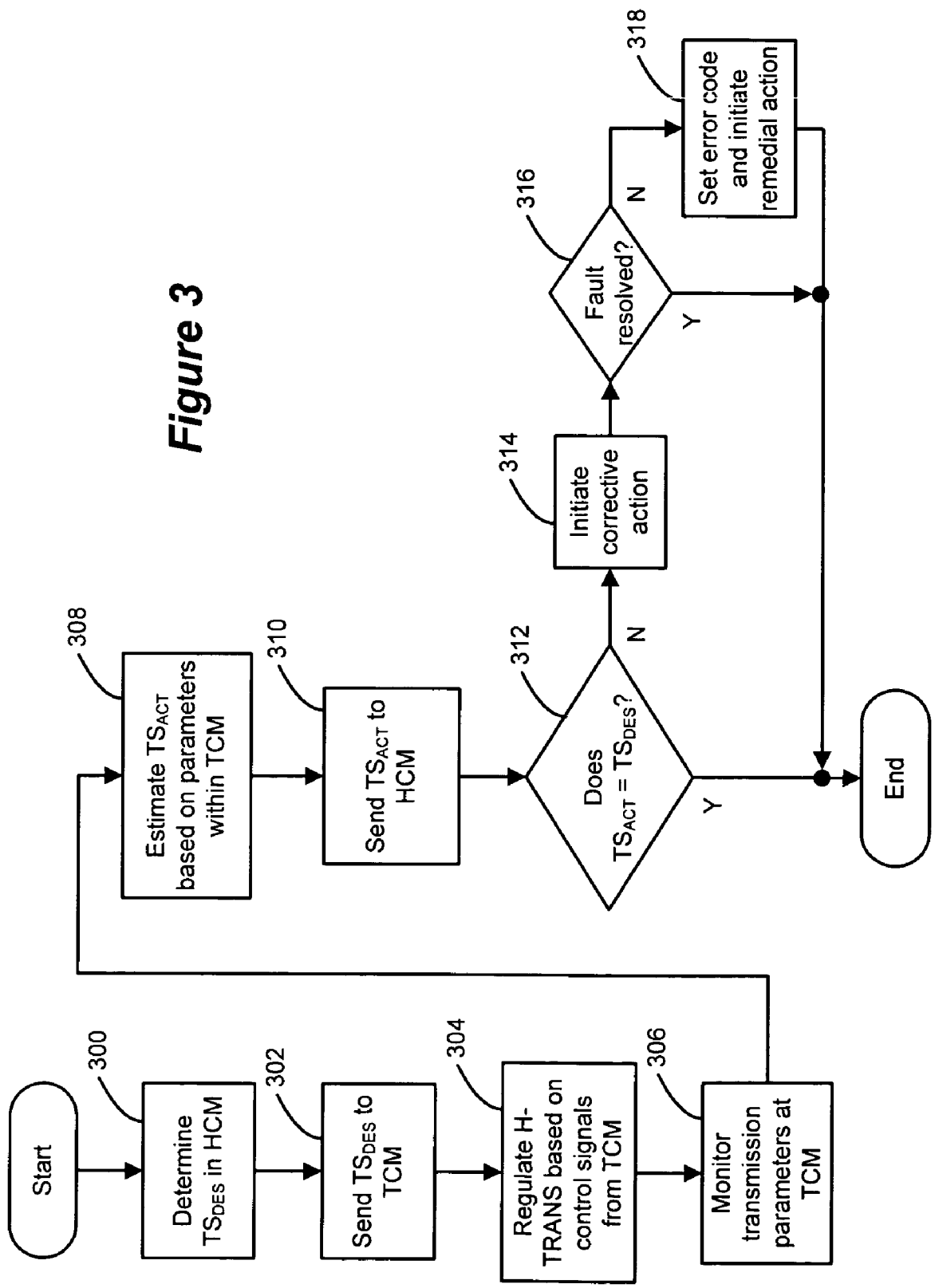
FIG. 3 is a flowchart illustrating exemplary steps that are executed by the hybrid vehicle control of the present disclosure.

Referring now to FIG. 3, exemplary steps that are executed by the hybrid vehicle control of the present disclosure will be described in detail. In step 300, control determines $TS_{DES}$ in the first module 50. In step 302, control sends $TS_{DES}$ to the second module 52 over the CAN bus. Control regulates the hybrid transmission 12 in step 304 based on the control signals generated by the second module 52, which are based on $TS_{DES}$. In step 306, control monitors the transmission parameters at the second module 52. Control estimates $TS_{ACT}$ within the second module 52 in step 308 based on the transmission parameters. In step 310, $TS_{ACT}$ is sent to the first module 50 via the CAN bus.

In step 312, control determines whether $TS_{ACT}$ is equal to $TS_{DES}$. If $TS_{ACT}$ is equal to $TS_{DES}$, control ends. If $TS_{ACT}$ is not equal to $TS_{DES}$, control initiates corrective action in step 314. In step 316, control determines whether the fault is resolved. If the fault is resolved, control ends. If the fault is not resolved, control sets an error code in step 318, initiates remedial action and control ends.

The present disclosure provides a system and method that ensures secure transmission commands that correspond to a desired transmission state without requiring a parallel path with a seed and key in either of the control modules and without requiring a duplicate path in a separate control module. In this manner, a secure transmission state is provided without complex and costly control modules. Eliminating the seed and key and parallel paths should result in less commuter resource utilization in the form of ROM, RAM and throughput. CAN communication resources may also be reduced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A hybrid transmission control system, comprising:
a first module that determines a desired transmission state;
a second module that generates transmission control signals based on said desired transmission state, that receives at least one transmission parameter signal, that determines an actual transmission state based on said at least one transmission parameter signal; and
wherein the first module determines whether a fault within said hybrid transmission control system based on said desired transmission state and said actual transmission state.

2. The hybrid transmission control system of claim 1 wherein said desired transmission state is determined based on a plurality of operating parameters.

3. The hybrid transmission control system of claim 1 wherein said first module signals a fault when said desired transmission state is not equivalent to said actual transmission state.

4. The hybrid transmission control system of claim 1 wherein said first module initiates corrective action when said fault is signaled.

5. The hybrid transmission control system of claim 1 wherein said first module initiates remedial action when said fault is signaled.

6. The hybrid transmission control system of claim 1 wherein said at least one transmission parameter signal corresponds to a parameter of one of a solenoid and an on-off switch of a hybrid transmission.

7. The hybrid transmission control system of claim 6 wherein said parameter includes a position.

8. The hybrid transmission control system of claim 6 wherein said parameter includes a pressure.

9. A method of regulating operation of a hybrid transmission in a vehicle, comprising:
determining a desired transmission state using a first module;
generating transmission control signals based on said desired transmission state using a second module;
receiving at least one transmission parameter signal at said second module;
determining an actual transmission state based on said at least one transmission parameter signal at said second module; and
determining whether a fault within said hybrid transmission control system based on said desired transmission state and said actual transmission state at said first control module.

10. The method of claim 9 wherein said desired transmission state is determined based on a plurality of operating parameters.

11. The method of claim 9 further comprising signaling a fault when said desired transmission state is not equivalent to said actual transmission state.

12. The method of claim 9 further comprising initiating corrective action when said fault is signaled.

13. The method of claim 9 further comprising initiating remedial action when said fault is signaled.

14. The method of claim 9 wherein said at least one transmission parameter signal corresponds to a parameter of one of a solenoid and an on-off switch of a hybrid transmission.

15. The method of claim 14 wherein said parameter includes a position.

16. The method of claim 14 wherein said parameter includes a pressure.

17. A method of diagnosing a fault within control system of a hybrid transmission, comprising:
determining a desired transmission state using a first module;
storing said desired transmission state and a corresponding time stamp in said first module;
generating transmission control signals based on said desired transmission state using a second module;
receiving at least one transmission parameter signal at said second module, wherein said transmission parameter signal corresponds to a transmission state associated with said transmission control signals;
determining an actual transmission state based on said at least one transmission parameter signal at said second module;
associating said actual transmission state with said time stamp;
retrieving said desired transmission state from memory based on said time stamp; and
determining whether a fault within said hybrid transmission control system based on said desired transmission state and said actual transmission state at said first control module.

18. The method of claim 17 wherein said desired transmission state is determined based on a plurality of operating parameters.

19. The method of claim 17 further comprising signaling a fault when said desired transmission state is not equivalent to said actual transmission state.

20. The method of claim 17 further comprising initiating corrective action when said fault is signaled.

21. The method of claim 17 further comprising initiating remedial action when said fault is signaled.

22. The method of claim 17 wherein said at least one transmission parameter signal corresponds to a parameter of one of a solenoid and an on-off switch of a hybrid transmission.

23. The method of claim 22 wherein said parameter includes a position.

24. The method of claim 22 wherein said parameter includes a pressure.

* * * * *